Patented May 23, 1944

2,349,789

UNITED STATES PATENT OFFICE 2,349,789

CONCENTRATION AND PRESERVATION OF TOCOPHEROL

Kenneth C. D. Hickman, Rochester, N. Y., assignor to Distillation Products, Inc., Rochester, N. Y., a corporation of Delaware No Drawing. Application October 30, 1942, Serial No. 463,896

9 Claims. (Cl. 260—333)

This invention relates to improved procedure for the concentration and/or preservation of tocopherol or vitamin E, contained in by-products or portions thereof produced during the vacuum-inert gas deodorization treatment of vegetable or animal oils.

In my copending application 321,913, filed March 2, 1940, of which this application is in part a continuation, I have described by-products obtained during the vacuum-inert gas deodorization treatment of vegetable or animal oils which by-products contain a relatively large amount of tocopherol. During vacuum-inert gas deodorization a small amount of matter is volatilized from the vegetable or animal oils and is carried over with the inert gas. This matter can be condensed from the inert gas at any point between the deodorizer and the exhaust of the vacuum system. When steam is used as the inert gas the material is usually skimmed from the top of the basin in which the barometric leg drains. It is also usual procedure to condense materials at an intermediate condenser between the deodorizer and the condenser for the steam. This volatilized material is known as "deodorizer sludge," "catch-all scum," "claber stock," etc. It is an exceedingly complex mixture of organic materials including free fatty acids, soaps, hydrocarbons, and other numerous materials which I have not as yet identified.

As disclosed in my copending application referred to above this deodorizer scum can be subjected to certain purification treatments in order to concentrate the tocopherol contained therein. However, I have found that there are substances present in the refinery scum which so nearly resemble the tocopherols in chemical and physical properties that distillation and solvent treatments will not effect separation of tocopherol therefrom. This has prevented economical preparation of concentrates, particularly of high concentration. Hickman et al. Application No. 358,270 describes other hydrogenation procedures employed in extracting vitamin E from said by-products.

This invention has for its object to overcome the above difficulties. Another object is to provide improved procedure for concentrating tocopherol contained in refinery scum and/or concentrates derived therefrom. A still further object is to provide improved procedure for concentrating and/or preserving complex mixtures which contain tocopherol and which are derived from the inert gas during vacuum deodorization of vegetable or animal oils. Other objects will appear hereinafter.

These and other objects are accomplished by my invention which includes hydrogenating the complex mixture which contains tocopherol and which is derived from the inert gas utilized for vacuum-inert deodorization. I have found that hydrogenation alters the chemical character of the interfering substances completely while the tocopherol remains unaltered. Separation of a concentrate from the hydrogenated material is then a relatively simple matter. The hydrogenation also yields a product which has substantially more stability than the unhydrogenated material.

My invention can be applied directly to the crude material obtained from the deodorization treatment, preferably after removal of water and filtering to remove suspended solids. After such hydrogenation the hydrogenated product may be further treated to separate the impurities, i. e., by distillation, solvent extraction, chromatographic adsorption, etc. On the other hand, it is frequently more desirable to first subject the crude source material to a preliminary concentration such as distillation, solvent extraction, etc., to obtain a partial concentrate. This product then can be hydrogenated and subjected, if desired, to the additional concentrating treatments such as distillation, solvent extraction, chromatographic adsorption, and the like. In either case the starting material contains substances which interfere with the subsequent separation or stability and hydrogenation converts these substances into materials having a completely different chemical character so that they no longer exert their undesirable properties.

The hydrogenation treatment is preferably a catalytic reduction in the presence of a hydrogenation catalyst such as nickel, silver, platinum, etc., under super atmospheric pressure. A pressure of about 25 to 2000 lbs. is usually employed although smaller or greater pressures can be used. Temperatures of between about 50 to 250° C. are preferred, especially temperatures between about 150° and 200° C., but lower or higher temperatures may be used. It is best that the hydrogenation treatment be continued until substantially complete hydrogenation is obtained. It is to be understood, however, that partial hydrogenation effects a marked improvement as to separation and stability and is to be included within the scope of my invention. Chemical reduction with nascent hydrogen may be employed.

if desired, but is not as satisfactory or economical a process as catalytic hydrogenation.

Example 1

Refinery scum containing about 3.6% tocopherol was dried under vacuum in a steam jacketed container. The product was preliminarily distilled under high vacuum to strip off 20–30% of volatile impurities. The residue containing about 4.5% tocopherol was distilled in a high vacuum unobstructed path still to separate a tocopherol fraction which was wintered to remove stearine. This material contained approximately 41.7% tocopherol and was hydrogenated at 160° C. in the presence of 1.0% by weight of Rufert nickel catalyst containing .2% active nickel for 1½ hours at 50 lbs. hydrogen pressure. This was dissolved in five volumes of acetone and cooled to −50° C. The granular precipitated solids were filtered and the filtrate was evaporated. The residue contained 78.7% mixed tocopherols (95.7% recovery). Thus, the potency of the tocopherol concentrate was doubled by the purification procedure. A similarly cooled solution of the same, but unhydrogenated distillate in acetone gave a difficultly filterable mass. The filtrate on evaporation gave a residue whose tocopherol potency was only 10% higher than that of the concentrate before cooling in acetone. Thus, hydrogenation markedly increased the concentration effected by solvent extraction. Instead of acetone other vitamin E solvents such as low molecular weight alcohols, petroleum ether, etc., may be used.

Example 2

A crude tocopherol concentrate prepared as described in Example 1 was hydrogenated with 1.4% by weight of a Rufert catalyst (containing 24.5% nickel) for two hours at 140° C. The catalyst was filtered, the oil distilled, and the vitamin E fraction collected.

The stability of a sample of this preparation was compared with that of the unhydrogenated vitamin E concentrated by the so-called Swift stability test. In this test air was bubbled through the oil samples at 100° C. under controlled conditions and the percentage of tocopherols remaining after various periods of time was determined by the Emmerie-Engel assay procedure.

*Relative rate of decomposition of hydrogenated and unhydrogenated fraction in Swift stability test*

| Sample | Time | | |
|---|---|---|---|
| | 9 hours | 18 hours | 27 hours |
| Unhydrogenated | 70 | 40 | 25 |
| Hydrogenated | 99 | 78 | 61 |

The improved tocopherol products described herein can be used to stabilize oxidizable substances especially animal and vegetable fats or oils such as shortenings, including lard. Because of the increased stability as a result of the reduction a greater resistance to oxidation is imparted to the oxidizable substance to which the tocopherol-containing product is added. Hydrogenated tocopherol products from crude or refined scum may be utilized in this way. Likewise the crude or refined, but unhydrogenated scum may be added to the oxidizable material such as shortening and the entire mixture hydrogenated to obtain a mixture of improved stability.

What I claim is:

1. The process of preparing a tocopherol concentrate which comprises reducing a lighter than water complex mixture which contains tocopherol and which is derived from the inert gas after it has been passed through a member of the group consisting of tocopherol-containing vegetable and animal oils during vacuum-inert gas deodorization.

2. The process of preparing a tocopherol concentrate which comprises reducing a lighter than water complex mixture which contains tocopherol and which is derived from the inert gas after it has been passed through a member of the group consisting of tocopherol-containing vegetable and animal oils during vacuum-inert gas deodorization and separating tocopherol in concentrated form from the reduced mixture.

3. The process which comprises hydrogenating a lighter than water complex mixture which contains tocopherol and impurities not separable from the tocopherol by distillation which mixture is derived from the steam after it has been passed through a member of the group consisting of tocopherol-containing vegetable and animal oils during vacuum-steam deodorization.

4. The process of preparing a tocopherol concentrate which comprises hydrogenating a lighter than water complex mixture which contains tocopherol and which is derived from the steam after it has been passed through a member of the group consisting of tocopherol-containing vegetable and animal oils during vacuum-steam deodorization and separating tocopherol in concentrated form from the reduced mixture.

5. The process of preparing a tocopherol concentrate which comprises hydrogenating a lighter than water complex mixture which contains tocopherol and which is derived from the steam after it has been passed through a member of the group consisting of tocopherol-containing vegetable and animal oils during vacuum-steam deodorization subjecting the hydrogenated complex mixture to vacuum distillation and separating a fraction containing tocopherol in concentrated form.

6. The process of preparing a tocopherol concentrate which comprises in combination subjecting a lighter than water complex mixture which contains tocopherol and which is separated from the inert gas after it has been passed through a member of the group consisting of tocopherol-containing vegetable and animal oils during vacuum-inert gas deodorization to a purification treatment whereby a tocopherol concentrate is obtained which also contains impurities which are not completely removable by vacuum distillation, hydrogenating this tocopherol concentrate and separating tocopherol in concentrated form from the hydrogenated mixture.

7. The process of preparing a tocopherol concentrate which comprises in combination subjecting a lighter than water complex mixture which contains tocopherol and which is separated from the inert gas after it has been passed through a member of the group consisting of tocopherol-containing vegetable and animal oils during vacuum-inert gas deodorization, to distillation to separate a fraction containing a higher concentration of tocopherol than the complex starting mixture, hydrogenating this fraction and then separating tocopherol in concentrated form from the hydrogenated fraction.

8. The process of preparing a tocopherol concentrate which comprises in combination subjecting a lighter than water complex mixture which contains tocopherol and which is separated from the inert gas after it has been passed through a member of the group consisting of tocopherol-containing vegetable and animal oils during vacuum-inert gas deodorization, to distillation to separate a fraction containing a higher concentration of tocopherol than the complex starting mixture, hydrogenating this fraction and subjecting the hydrogenated fraction to solvent extraction with a tocopherol solvent.

9. The process of preparing a tocopherol concentrate which comprises in combination subjecting a lighter than water complex mixture which contains tocopherol and which is separated from the inert gas after it has been passed through a member of the group consisting of tocopherol-containing vegetable and animal oils during vacuum-inert gas deodorization, to distillation to separate a fraction containing a higher concentration of tocopherol than the complex starting mixture, hydrogenating this fraction, subjecting the hydrogenated fraction to vacuum distillation and separating a fraction containing tocopherol in concentrated form.

KENNETH C. D. HICKMAN.